US005519215A

United States Patent [19]

Anderson et al.

[11] Patent Number: 5,519,215

[45] Date of Patent: May 21, 1996

[54] PLASMA MASS SPECTROMETRY

[76] Inventors: Stephen E. Anderson, 58 Moorhead Drive, Mill Park, Victoria 3082; Ian L. Turner, 3 Grimwade Street, Reservoir, Victoria 3073, both of Australia

[21] Appl. No.: 207,432

[22] Filed: Mar. 7, 1994

[30] Foreign Application Priority Data

Mar. 5, 1993 [AU] Australia .............................. PL7643

[51] Int. Cl.$^6$ .............................. B01D 59/44; H01J 49/00

[52] U.S. Cl. .............................. 250/288; 250/281

[58] Field of Search .............................. 250/281, 288

[56] References Cited

U.S. PATENT DOCUMENTS

| | | | |
|---|---|---|---|
| Re. 33,386 | 2/1985 | Douglas | 250/288 |
| 3,958,883 | 5/1976 | Turner | 356/85 |
| 4,501,965 | 2/1985 | Douglas | 250/288 |
| 4,629,940 | 12/1986 | Gagne | 315/111.51 |
| 4,682,026 | 7/1987 | Douglas | 250/288 |
| 4,849,675 | 7/1989 | Müller | 315/111.51 |
| 4,955,717 | 9/1990 | Henderson | 250/288 |
| 4,982,140 | 1/1991 | Witting | 315/248 |
| 4,999,492 | 3/1991 | Nakagawa | 250/281 |
| 5,185,523 | 2/1993 | Kitagawa et al. | 250/281 |
| 5,194,731 | 3/1993 | Turner | 250/281 |
| 5,383,019 | 1/1995 | Farrell et al. | 250/288 |

FOREIGN PATENT DOCUMENTS

| | | | |
|---|---|---|---|
| 112004 | 6/1984 | European Pat. Off. | H01J 49/04 |
| 155496 | 9/1985 | European Pat. Off. | H05H 1/30 |
| 468742 | 1/1992 | European Pat. Off. | H01J 49/10 |
| 48-073848 | 4/1983 | Japan | G01N 21/73 |

OTHER PUBLICATIONS

Article by Rudolph, R. N. and Moore, J. H., entitled "Plasma Polymerization and a–C:H Film Ablation in Microwave Discharges in Methane Diluted with Argon and Hydrogen", published in *Plasma Chemistry and Plasma Processing*, vol. 10, No. 3, 1990.

*Primary Examiner*—Bruce C. Anderson
*Attorney, Agent, or Firm*—Edward Berkowitz

[57] ABSTRACT

A plasma mass spectrometer has a plasma ion source (1). The source has associated with it an electromagnetic excitation means (2), which may be one or more induction coils. The excitation means is powered by an RF generator (3). Ions are sampled from the plasma ion source through an interface (15) into a vacuum chamber (16). The stream of ions is directed by an ion optics element (4) through a mass analyser (5) to an ion detector (6). The excitation means may include means (7) for altering the axial component of the electromagnetic field sustaining the plasma. Alternatively or additionally, the spectrometer may include signal detecting means (11,17) to provide feedback enabling optimisation of parameters.

20 Claims, 9 Drawing Sheets

PLASMA MASS SPECTROMETRY

This specification relates to the adjusting of a plasma mass spectrometer. It relates particularly but not exclusively to an improved adjustment mechanism for a plasma ion source and to a feedback mechanism allowing fine tuning of plasma parameters.

The most commonly used type of plasma mass spectrometer is an inductively coupled plasma mass spectrometer. Other types include the glow discharge plasma mass spectrometer and the microwave induced plasma mass spectrometer. The improvements described in this specification will be described with particular reference to inductively coupled plasma mass spectrometers, but it is to be understood that they are applicable also to the other types of spectrometers.

A plasma mass spectrometer comprises a plasma ion source, an interface, at least one ion optics element for directing a stream of ions, a mass analyser and an ion detector. The plasma ion source for an inductively-coupled plasma mass spectrometer normally comprises an argon plasma, into which the sample to be analysed is introduced. A radio frequency (RF)induction means having one or more coils surrounds the argon plasma and sustains the plasma. In a microwave plasma mass spectrometer the plasma is sustained by microwave radiation, and in a glow discharge plasma mass spectrometer the plasma is created by the effect of electrical discharge on a solid which is to be analysed. Particles from the plasma are typically extracted into a vacuum chamber through one or more orifices in a plasma/mass spectrometer interface, and the stream of ionized particles thus created is directed through the vacuum chamber by means of ion optics lenses and a mass filter to an ion detector.

In the operation of plasma mass spectrometers, a frequently desired objective is that the ratio of signal to background noise measured at the ion detector be maximized. In order to improve the quality of measurements, it is necessary to reduce the relative amount of background noise. A different objective which is sometimes desired is the maximization of the net signal level of ions. Another objective is minimization of ions arising from molecular species; another objective is control of the level of ions carrying multiple positive charges rather than the usual single positive charge. Various known plasma parameters can be adjusted to achieve these objectives.

One such parameter which can be adjusted is the location of the plasma torch relative to the interface orifices. Slight changes in location may result in substantial changes in analyte ion flux through the orifices.

Another parameter which can be adjusted is the rate of flow of the gas carrying the sample to be analysed into the plasma.

Another parameter which can be adjusted is the RF power provided to the induction means. U.S. Pat. No. 3,958,883 describes a method of optimizing power transfer between the induction coil and the plasma. U.S. Pat. No. 4,629,940 describes another such method.

A factor identified in patent literature as affecting the performance of inductively coupled plasma mass spectrometry is the amount of electrical discharge occurring at the interface between the plasma source and the mass spectrometer. One way in which the amount of discharge can be reduced is by applying an RF bias voltage to the interface. This method is suggested in U.S. Pat. No. 4,682,026. Another way of reducing the amount of discharge is suggested in U.S. Pat. No. 4,501,965 and U.S. reissued Patent 33,386. This technique involves grounding the center of the induction coil, thereby reducing the peak-to-peak voltage variations of the plasma and so reducing the amount of electrical discharge at the interface. However, while these methods do result in reduced discharge and therefore improved analytical performance, there is still scope for further improvement.

Although each of the above parameters can be optimized, there is no convenient technique for measuring when a particular parameter has been optimized. It is possible to observe characteristics of the ion signals at the ion detector, then to adjust a parameter and re-assess the characteristics of the ion signals to determine whether the adjustment has resulted in an improvement, but this method of monitoring the results of adjustments can be slow. Moreover, the method does not conveniently allow an operator to monitor the signal during standard operation for changes brought about by drifting parameter conditions or by variations in composition of the samples. Furthermore, the method provides no assistance when no signal at all is being received at the ion detector, and the operator is unsure as to which parameter(s) require adjustment.

According to a first aspect of the present invention, there is provided a plasma mass spectrometer comprising:

(a) a plasma ion source having an electromagnetic excitation means associated therewith;

(b) an alternating radio frequency (RF) power generator providing RF power to the excitation means;

(c) an interface for sampling ions from the plasma into a vacuum chamber;

(d) at least one ion optics element for directing a stream of ions from the interface;

(e) a mass analyser and ion detector; and (f) means for altering the axial component of the electromagnetic field sustaining the plasma while the plasma is operating.

It is preferred that the means for altering the axial component of the electromagnetic field comprise an impedance matching circuit. The axial component of the electromagnetic field can then be varied simply by adjusting the ratio of capacitors in the impedance matching circuit until the location which produces the desired analytical characteristics has been achieved.

It is further preferred that the electromagnetic excitation means comprise one or more induction coils. Alternatively, the excitation means may comprise a microwave source or an electrical discharge source.

According to a second aspect of the invention, there is provided a plasma mass spectrometer comprising:

(a) a plasma ion source having an electromagnetic excitation means associated therewith;

(b) an interface for sampling ions from the plasma into a vacuum chamber;

(c) at least one ion optics element for directing a stream of ions from the interface;

(d) a mass analyser and ion detector; and (e) electromagnetic signal detecting means located upstream from the ion detector;

wherein, in operation, the electromagnetic signal detecting means provides feedback information enabling the optimization of one or more parameters governing the characteristics and location of the ion source.

The electromagnetic signal detecting means may be any suitable signal detecting means. In one embodiment, the electromagnetic signal detecting means may detect an RF signal. In an alternative embodiment, the electromagnetic signal detecting means may detect direct current or voltage. In such embodiments, the signal may be detected outside the path of the ion stream, or it may be detected on an ion optics element, or it may be detected in the ion stream independently of any ion optics element.

The ion optics elements in a mass spectrometer may include an extraction lens and a plurality of other ion optics lenses. In one embodiment the electromagnetic signal detecting means may be attached to either the extraction lens or the first lens. Alternatively, the electromagnetic signal detecting means may be attached to any of the other lenses or it may be separate from the ion optics elements.

While maximizing the net ion signal or the ratio of the signal to the background noise are the most common and generally useful ways of optimizing the various operating parameters in plasma mass spectrometry, other criteria may sometimes be more appropriate. One such criterion is the level of ions arising from molecular species; another is the level of ions carrying multiple positive charges rather than the usual single positive charge. It should be understood that this invention is capable of application in these circumstances, and that the relationship between the monitored electromagnetic signal and the desired set of operating conditions will have to be established empirically. Once the relationship has been established, this invention allows the desired conditions to be reached quickly and easily, without the need to repeat the optimization process.

The invention wild hereinafter be described in greater detail by reference to the attached drawings which exemplify the invention. It is to be understood that the particularity of those drawings does not supersede the generality of the preceding description of the invention.

Figure 8A:
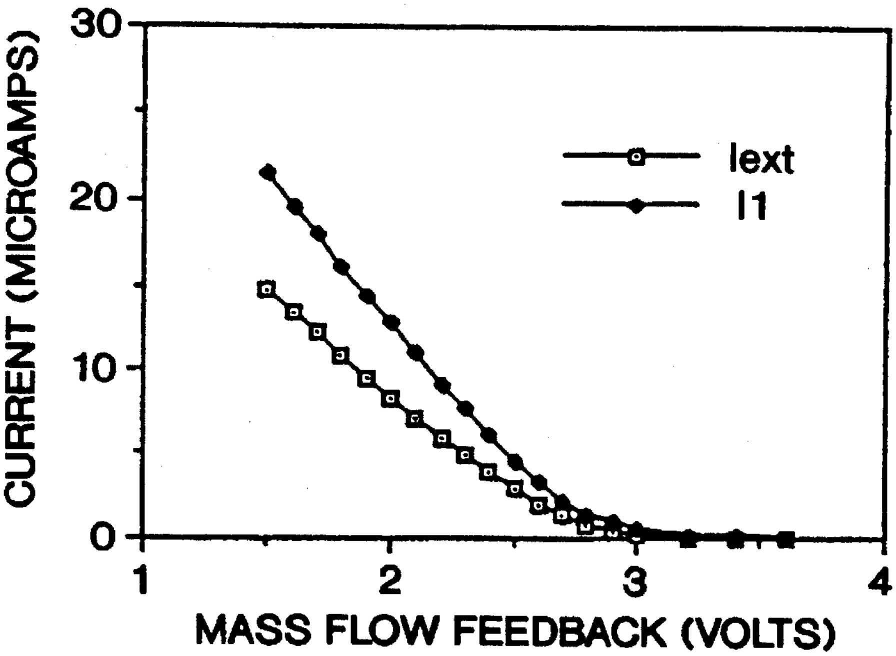
Figure 8B:
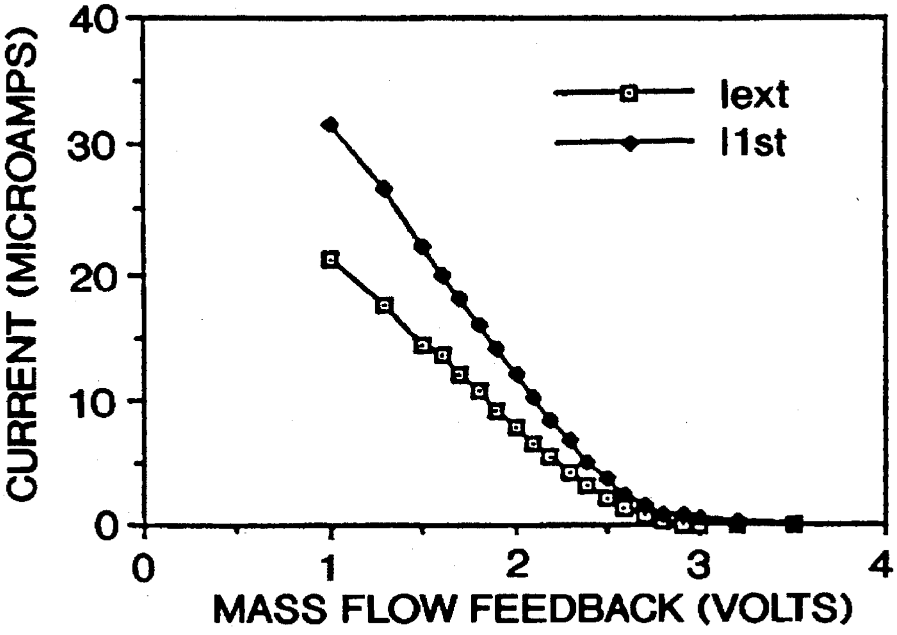

FIGS. 8A–B shows the effect of the flow rate of the gas carrying the analytical sample on the currents measured at the extraction lens and at the first lens element.

Figure 9A:
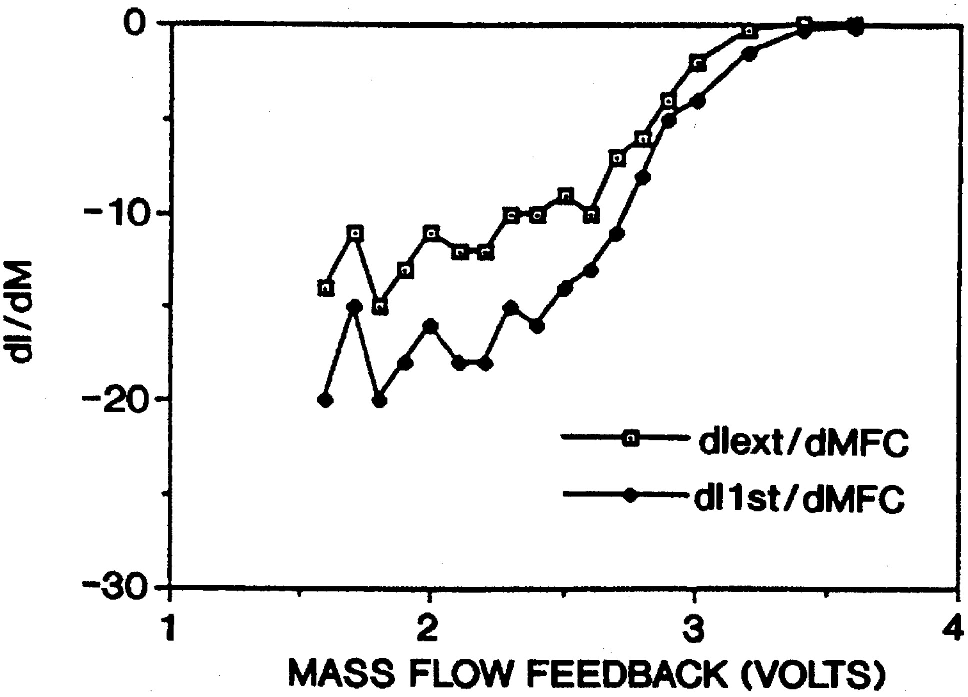
Figure 9B:
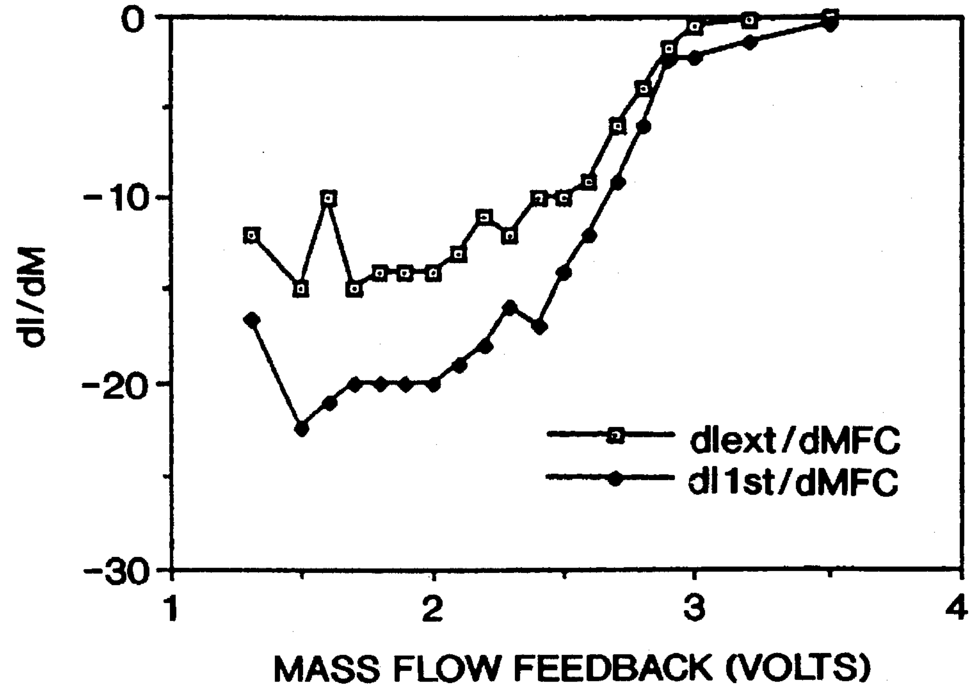

FIGS. 9A–B shows the first derivative of the curves shown in FIG. 8.

Figure 1:
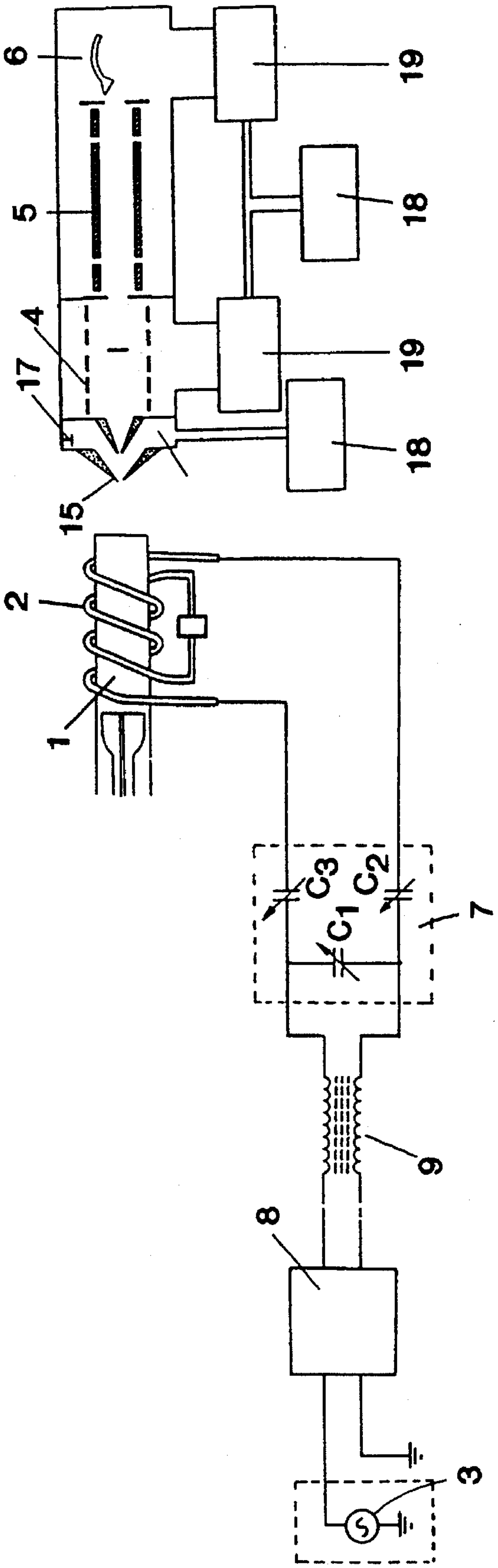
FIG. 1 is a schematic diagram of an embodiment of apparatus illustrating the first aspect of the present invention.

Referring now to FIG. 1, the plasma mass spectrometer comprises a plasma ion source 1 having electromagnetic excitation means comprising induction coils 2 associated therewith. Alternating RF power generator 3 provides RF power to induction coils 2. Interface 15 samples ions from plasma 1 into first vacuum chamber 10, and then through skimmer cone 14 into main vacuum chamber 16. At least one ion optics lens 4 directs a stream of ions from interface 15. The ion stream passes through mass analyser 5 to ion detector 6. The various chambers are maintained at low pressure by rotary pumps 18 and turbomolecular pumps 19.

In the first aspect of the invention, the circuitry of induction coils 2 includes means 7 for altering the axial component of the electromagnetic field. In the preferred embodiment, means 7 comprises an impedance matching circuit. In the embodiment illustrated, RF generator 3 is connected through magnitude and phase detectors 8 and 1:1-unbalanced-to-balanced balun 9 to an impedance matching circuit 7, which comprises three variable capacitors, C1, C2 and C3. The capacitors are preferably controlled via stepper motors. Magnitude and phase detectors 8 generate analog signals which indicate the impedance match between RF generator 3 and the load (that is, balun 9, impedance matching circuit 7 and coils 2). The analog output signals are used to control the stepper motors connected to the capacitors. Any change in the plasma load results in an impedance mismatch between the load and generator 3. This in turn produces analog signals from magnitude and phase detectors 8 which are used to adjust the capacitance of the capacitors. Change of the capacitance results in an impedance match between the RF generator 3 and the load.

The coils 2 illustrated in FIG. 1 are interlaced coils of the type described in Australian Patent Application 81234/91, having the advantages therein described.

Variation in the C2 to C3 ratio results in a change in the amount of axial electric field that is cancelled. When the capacitance of C3 is altered, magnitude and phase detectors 8 generate analog control signals which change the capacitance of capacitors C1 and C2 such that an impedance match always exists between the RF generator 3 and the load. This provides a simple means of altering the axial component of the electromagnetic field.

In operation, the axial component of the electromagnetic field may be varied in order to achieve a desired result such as the optimization of signal to noise ratio at the ion detector. The results of adjustments may be monitored at the ion detector; however, such a monitoring method has the disadvantages previously described.

The second aspect of the invention provides an improved method of monitoring the results of adjustments to the axial component of the electromagnetic field or to any one or more of a number of parameters governing the plasma conditions.

Figure 2:
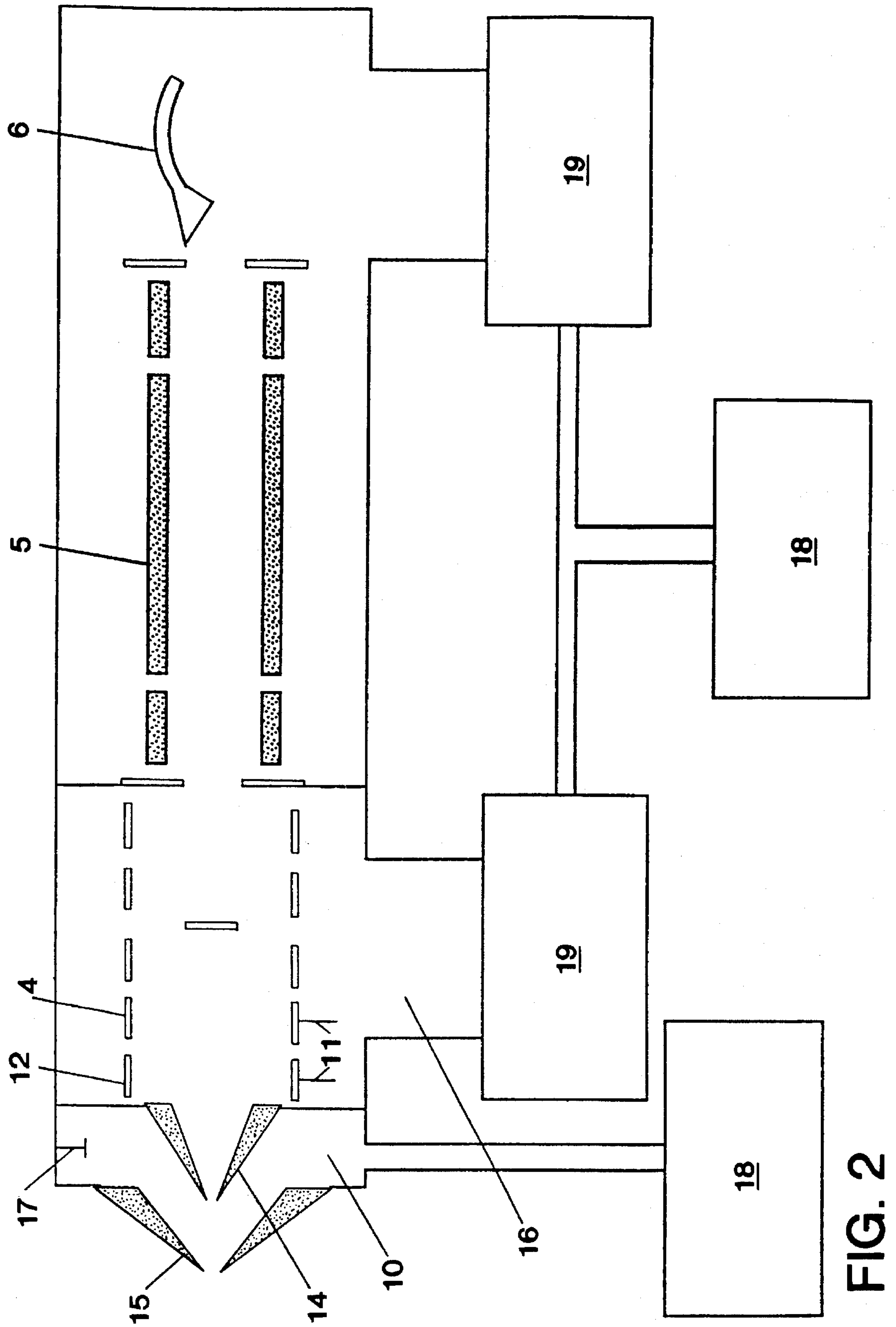
FIG. 2 is a schematic diagram showing the mass spectrometer in more detail and illustrating the second aspect of the invention.

In the embodiment illustrated in FIG. 2, electromagnetic signal detecting means 11 are provided on first ion optics lens 4 and/or on extraction lens 12. Extraction lens 12 is located behind skimmer cone 14. In operation, the electrical signal detecting means 11 provides feedback information enabling the adjustment of one or more parameters governing the characteristics of the ion source and the collection of the resulting ions. In an automated embodiment, the feedback provided by detecting means 11 may be used to adjust parameters automatically. Detecting means 11 may measure direct current, voltage, or RF signal.

It has been found that an RF potential can be measured by placing a metallic probe 17 inside vacuum chamber 10 in the interface to the mass spectrometer or inside main vacuum chamber 16.

Figure 3:
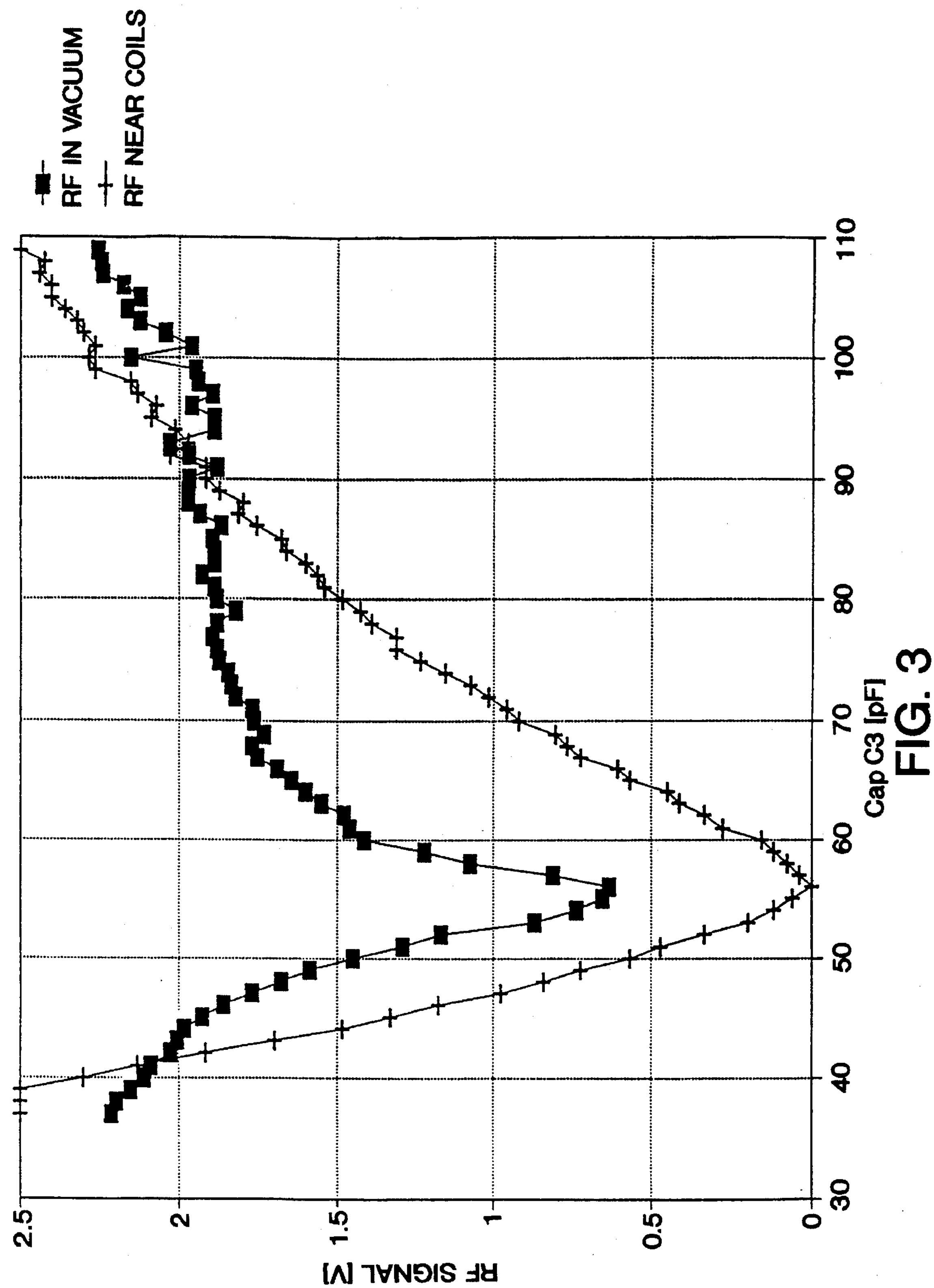
FIG. 3 is a plot of the electrical field measured in the first vacuum chamber of the mass spectrometer, and of the electrical field measured near the induction coils as the setting of capacitor C3 was varied.

Referring now to FIG. 3, the RF electromagnetic field measured near the interlaced coils assembly of FIG. 1 and the RF electromagnetic field detected by a probe in the first vacuum chamber are plotted against the setting of capacitor C3. The minima of the two curves substantially coincide.

The presence of an RF signal in the vacuum chambers does not appear to have been reported before. However, the inventors have found that the frequency of RF detected in the vacuum chambers is identical to the plasma excitation frequency. (The probes were well shielded so as to eliminate stray RF radiation.) The RF signal is detected in the vacuum chamber only when the vacuum chamber is operated at reduced pressures, and not when it is at atmospheric pressure. When the first vacuum chamber is operated at atmospheric pressure, ions do not pass into the vacuum chamber because a cool boundary layer of gas forms over the sampling cone orifice. Because the cool boundary layer is a good insulator, and the orifice (typically about 1mm) is small in comparison to the natural wavelength of the RF signal (typically about 7m), RF signal is not detected in the vacuum chamber. However, when the first vacuum chamber is operated at a pressure of about 1 Torr, RF signal is detected in the vacuum chamber.

A visible gas discharge has previously been reported in the first vacuum chamber. This appears to be an RF glow discharge, generated by RF energy which has been coupled into the first vacuum chamber via the sampled plasma.

Figure 4:
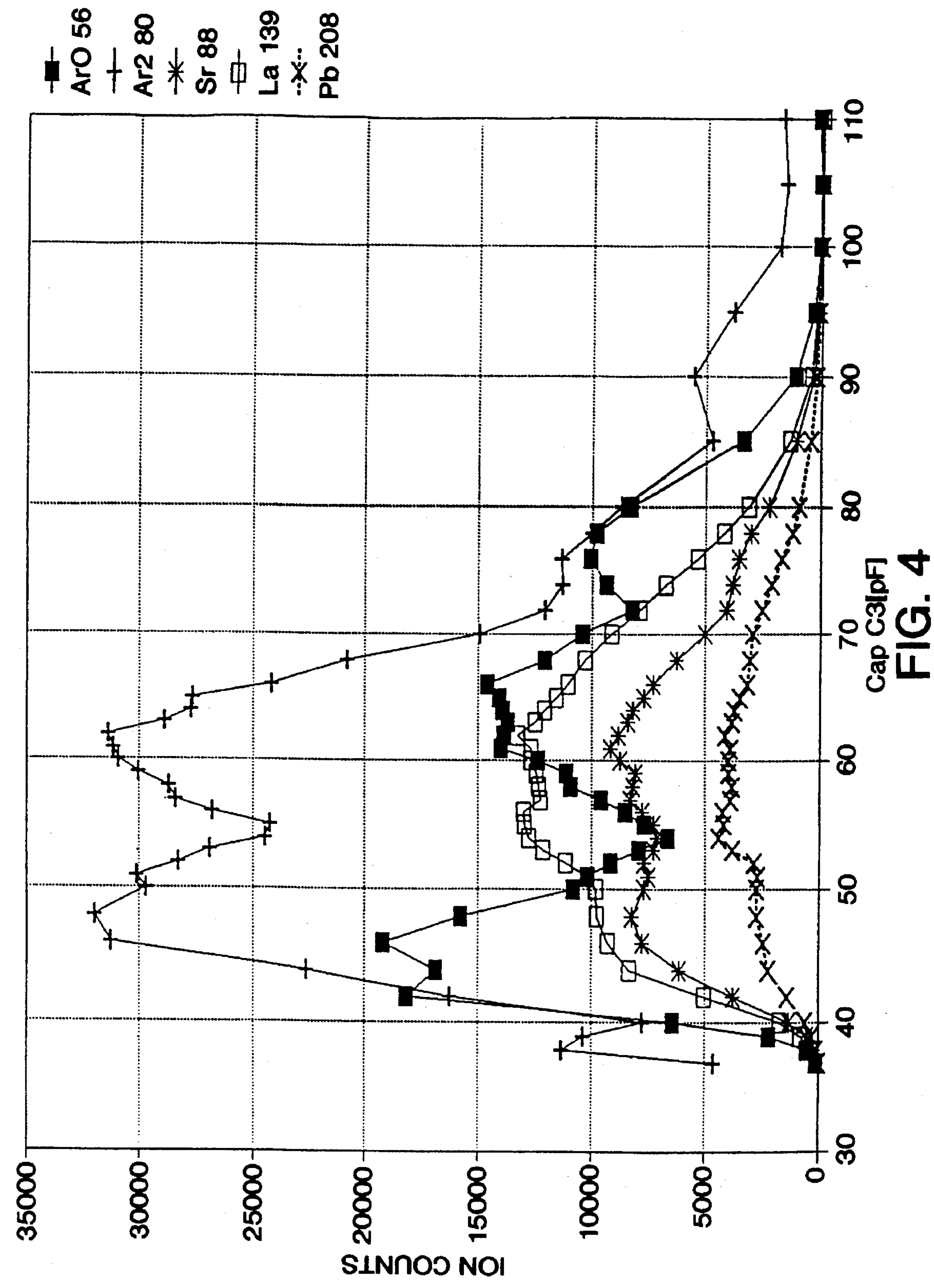
FIG. 4 is a plot of the ion signal intensity of particular elements detected as the setting of capacitor C3 was altered.

FIG. 4 shows experimental results obtained from an inductively coupled plasma mass spectrometer, with counts for various detected ions plotted against the capacitance of capacitor C3.

Figure 5:
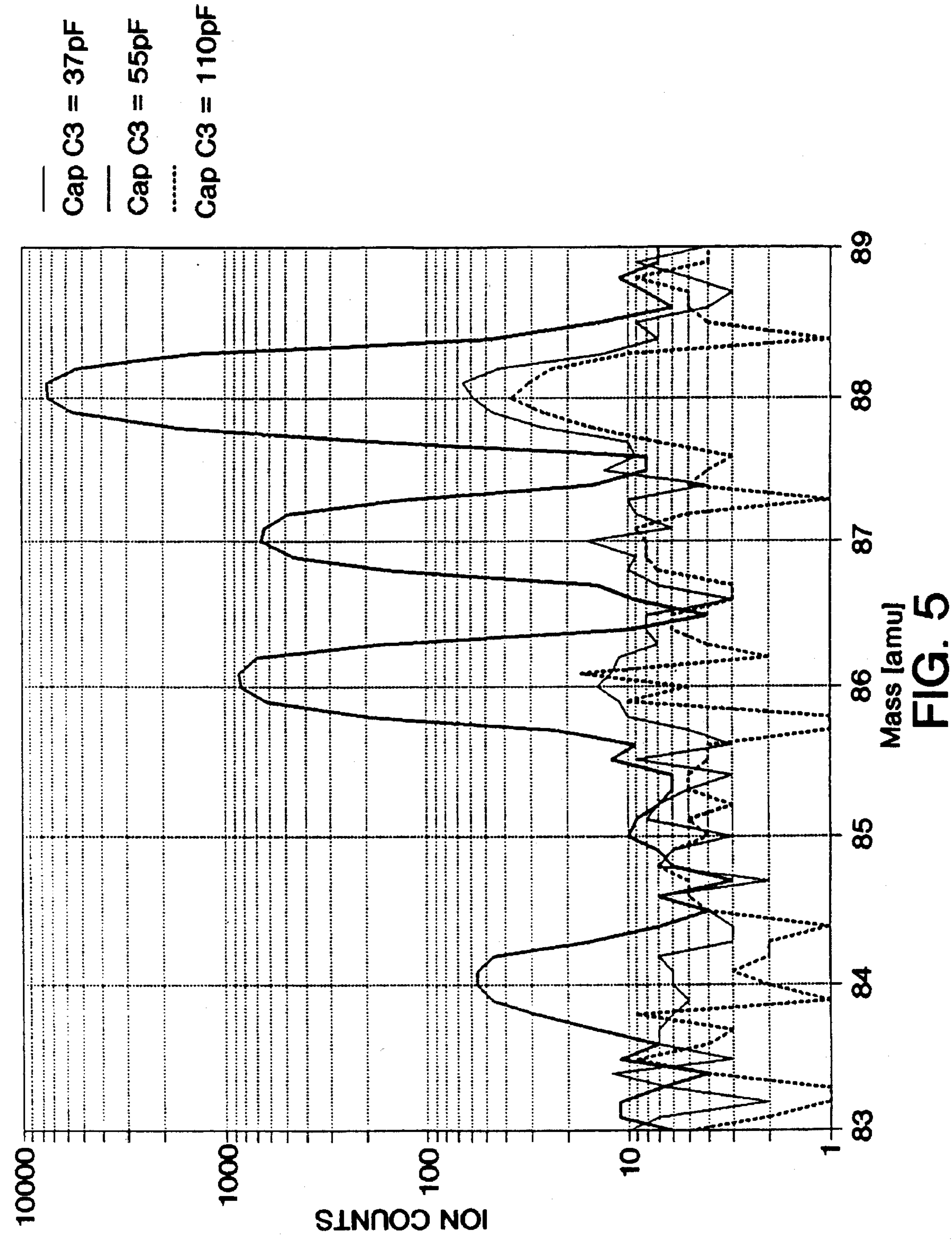
FIG. 5 shows three different plots of the mass spectrum of strontium measured at three different settings of capacitor C3.

FIG. 5 is a plot of three different measurements of the mass spectrum of strontium. In this experiment, the only variable was the setting of capacitor C3. FIG. 5 clearly illustrates that the setting of capacitor C3 can change the detected ion signals by almost two orders of magnitude.

Experimentation was carried out to demonstrate the efficacy of the monitoring provided by electromagnetic signal detecting means 11 on extraction lens 12 and first ion optics lens 4. The results are given in FIGS. 6 to 9. The signal detected by detecting means 11 was a direct current electrical signal.

Figure 6A:
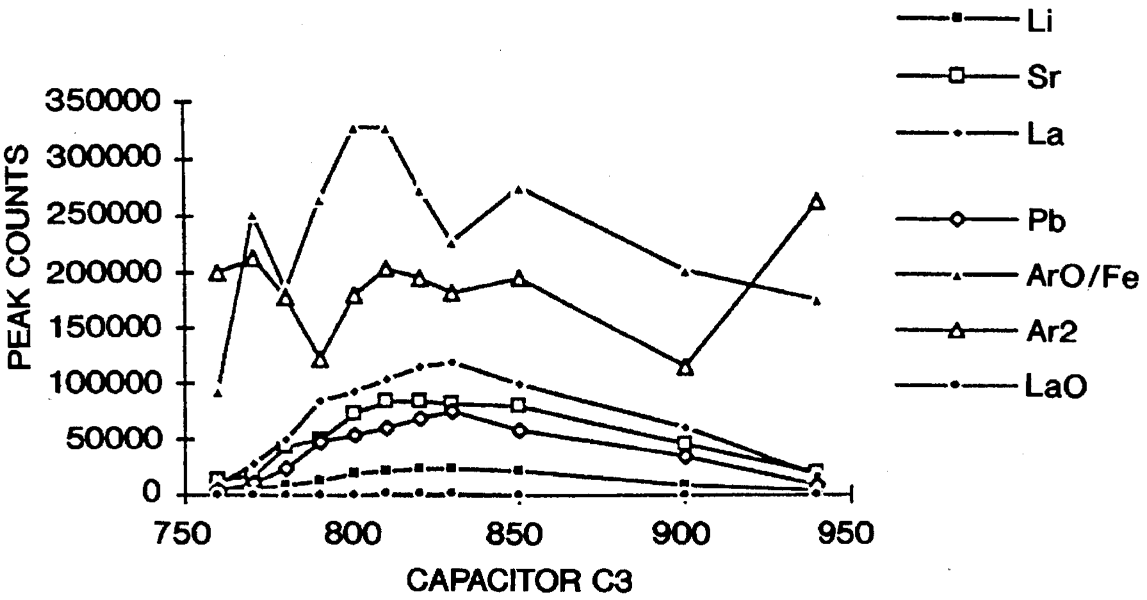
FIG. 6A is a plot of analytical ion signal as a function of the setting of capacitor C3.
Figure 6B:
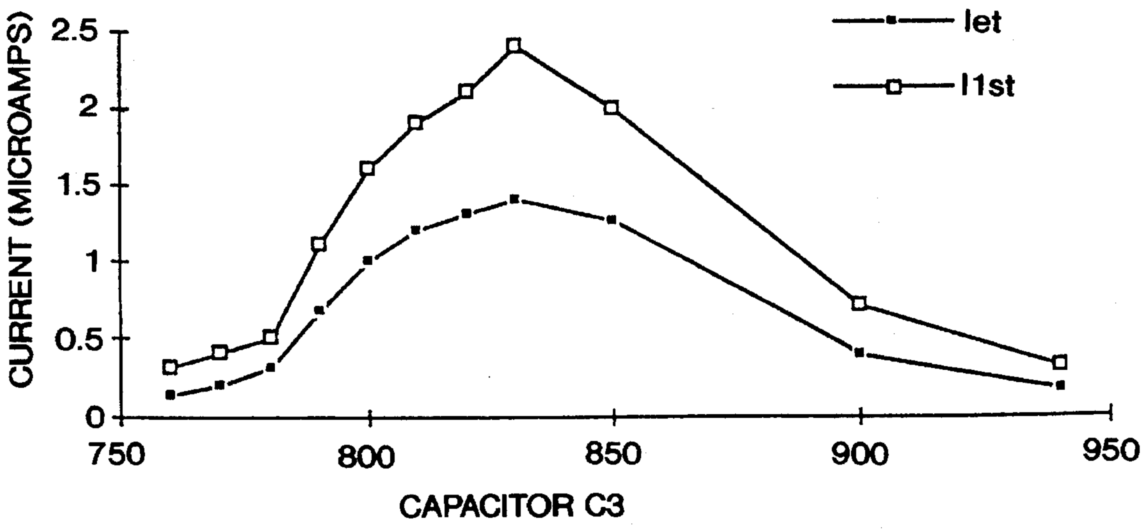
FIG. 6B is a plot of direct current detected at the extraction lens and at the first lens element as a function of the setting of capacitor C3.

FIG. 6A shows the detected ion signals for several analytes and some molecular species as a function of the setting of capacitor C3. For this experiment the capacitance of C3 was not calibrated, so the readings given on the horizontal axis are relative only and do not coincide with the readings on FIGS. 3 to 5. A detailed examination of the strontium mass spectrum shows that as the current measured at the ion lenses moves away from the maximum, the spectral resolution also degrades. The electric currents measured at the extraction lens and the first lens are shown in FIG. 6B as a function of the setting of capacitor C3. The currents detected at the two ion optics elements are similar. Maximum detected ion signal is achieved when the current measured at the lens elements is maximum.

Figure 7:
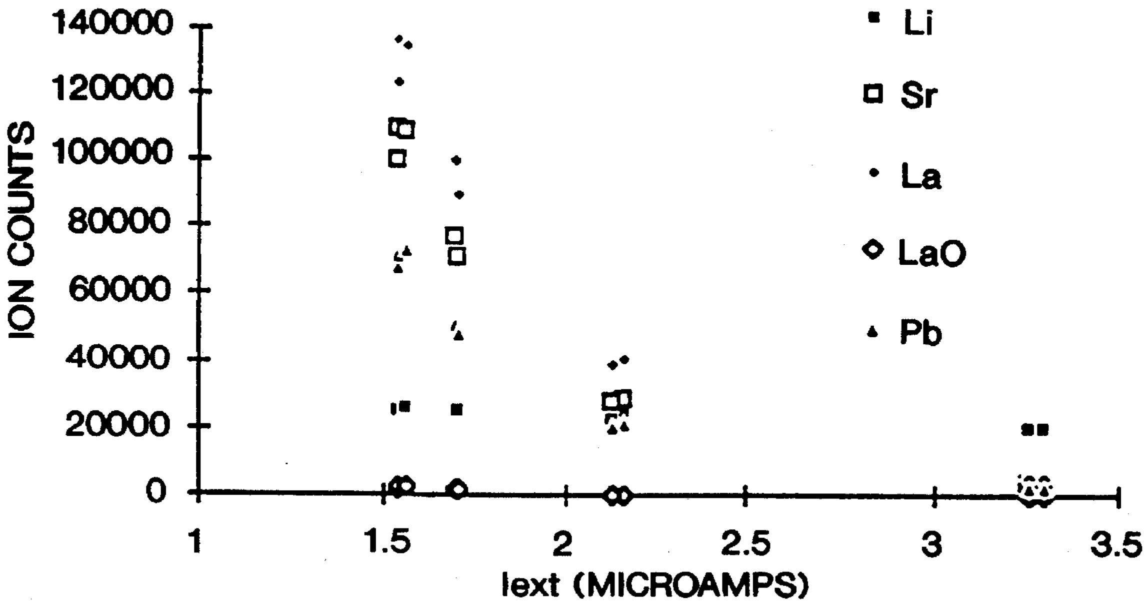
FIG. 7 is a plot of the relationship between analytical ion signal and current measured at the extraction lens as the position of the plasma torch was changed in a plane perpendicular to the axis of the torch.

The current measured at the extraction lens was then used to optimise the position of the plasma torch in a plane perpendicular to the axis of the plasma torch. The data in FIG. 7 show a minimum in the current measured at the extraction lens when the detected analyte ion signal is at a maximum. The data also show that the current is highly sensitive to plasma location. It was also found that the background noise was significantly less when the current measured at the extraction lens was at a minimum.

The variation of current measured at the ion lenses with the flow rate of the gas carrying the sample was then investigated. The results are shown in FIGS. 8A and 8B at sampling depths of approximately 10mm and 7mm respectively. The feedback voltage of a mass flow controller that was used to control the gas flow was used as a measure of the rate of gas flow. FIGS. 9A and 9B show the first derivative of the results of FIGS. 8A and 8B. The region of maximum gradient change corresponds closely with the optimum performance point as determined by observation of the mass spectrum.

These results therefore indicate that electromagnetic signal detecting means 11 or 17 can conveniently be used to optimize the various plasma parameters governing the characteristics of the ion source and the collection of the resulting ions.

It is to be understood that various alterations, additions and/or modifications may be made to the parts previously described without departing from the ambit of the invention.

We claim:

1. A plasma mass spectrometer comprising:

(a) a plasma ion source having an electromagnetic excitation means associated therewith;

(b) an alternating radio frequency (RF) power generator providing RF power to the excitation means;

(c) an interface for sampling ions from the plasma into a vacuum chamber;

(d) at least one ion optics element for directing a stream of ions from the interface;

(e) a mass analyser and ion detector; and (f) means for altering the axial component of the electromagnetic field sustaining the plasma in response to a signal derived from a signal detecting means located intermediate said interface and said ion detector while the plasma is maintained.

2. The plasma mass spectrometer according to claim 1 wherein the means for altering the axial component of the electromagnetic field comprises an impedance matching circuit disposed between said RF power generator and said excitation means.

3. The plasma mass spectrometer according to claim 2 wherein the electromagnetic excitation means comprises one or more induction coils.

4. The plasma mass spectrometer according to claim 3 wherein the impedance matching circuit comprises:

(a) a sub-circuit comprising in series a first variable capacitor, the one or more induction coils, and a second variable capacitor, respectively;

(b) a third capacitor arranged in parallel with the sub-circuit; and (c) a balanced drive source comprising two alternating drive signals of approximately equal magnitude and being approximately 180° out of phase, connected across the third capacitor.

5. The plasma mass spectrometer according to claim 3 or claim 4 wherein the electromagnetic excitation means comprises a pair of interlaced induction coils.

6. The plasma mass spectrometer of claim 3 wherein said signal detecting means comprises one said ion optics element.

7. The plasma mass spectrometer of claim 6 wherein said signal comprises a direct current intercepted by said ion optics element.

8. The plasma mass spectrometer of claim 1 wherein said signal detecting means is located outside said vacuum chamber.

9. The plasma mass spectrometer of claim 1 wherein said signal detecting means is located inside said vacuum chamber.

10. A plasma mass spectrometer comprising:

(a) a plasma ion source having an electromagnetic excitation means associated therewith;

(b) an interface for sampling ions form the plasma into a vacuum chamber;

(c) at least one ion optics element for directing a stream of ions from the interface;

(d) a mass analyzer and ion detector; and (e) electromagnetic signal detecting means located upstream from the ion detector; wherein, in operation, the electromagnetic signal detecting means provides feedback information enabling the optimization of one or more parameters governing the maintenance of the plasma and location of the ion source.

11. A plasma mass spectrometer according to claim 10 wherein the RF signal detecting means is a direct current or voltage detecting means.

12. A plasma mass spectrometer according to any one of claim 11 wherein the RF signal detecting means is attached to an ion optics element.

13. A plasma mass spectrometer according to claim 12 wherein the RF signal detecting means is attached to the extraction lens or the first lens.

14. A plasma mass spectrometer according to claim 10 wherein the RF signal detecting means is a probe located in the interface region.

15. The plasma mass spectrometer of claim 10 wherein said signal detecting means is located outside said vacuum chamber.

16. The plasma mass spectrometer of claim 10 wherein said signal detecting means is located inside said vacuum chamber.

17. A plasma mass spectrometer comprising:

(a) a plasma ion source having an RF excitation means associated therewith;

(b) an alternating RF power generator providing RF power to the excitation means;

(c) an interface for sampling ions from said plasma into a vacuum chamber;

(d) at least one ion optics element for directing a stream of ions from the interface;

(e) a mass analyser and ion detector;

(f) means for altering the axial component of the RF field sustaining the plasma while the plasma is operating; and (g) RF signal detecting means in said vacuum chamber upstream from the ion detector.

18. A plasma mass spectrometer according to claim 17 wherein the RF signal detecting means provides feedback information enabling the optimisation of the axial component of the electromagnetic field sustaining the plasma.

19. The plasma mass spectrometer of claim 17 wherein said signal detecting means is located outside said vacuum chamber.

20. The plasma mass spectrometer of claim 17 wherein said signal detecting means is located inside said vacuum chamber.

* * * * *